US010953513B2

(12) United States Patent
    Gratrix

(10) Patent No.: US 10,953,513 B2
(45) Date of Patent: Mar. 23, 2021

(54) METHOD FOR DETERMINISTIC FINISHING OF A CHUCK SURFACE

(71) Applicant: M Cubed Technologies, Inc., Newtown, CT (US)

(72) Inventor: Edward J. Gratrix, Monroe, CT (US)

(73) Assignee: M Cubed Technologies, Inc., Newtown, CT (US)

( * ) Notice: Subject to any disclaimer, the term of this patent is extended or adjusted under 35 U.S.C. 154(b) by 428 days.

(21) Appl. No.: 15/568,424

(22) PCT Filed: Aug. 10, 2016

(86) PCT No.: PCT/US2016/046335
§ 371 (c)(1),
(2) Date: Oct. 20, 2017

(87) PCT Pub. No.: WO2017/030867
PCT Pub. Date: Feb. 23, 2017

(65) Prior Publication Data
US 2018/0154496 A1    Jun. 7, 2018

Related U.S. Application Data

(60) Provisional application No. 62/205,643, filed on Aug. 14, 2015.

(51) Int. Cl.
*B24B 37/04* (2012.01)
*B23B 31/02* (2006.01)
(Continued)

(52) U.S. Cl.
CPC .......... *B24B 37/042* (2013.01); *B23B 31/021* (2013.01); *B24B 27/0076* (2013.01); *B24B 37/26* (2013.01); *B23B 2231/02* (2013.01)

(58) Field of Classification Search
CPC ... B24B 37/042; B24B 27/0076; B24B 37/26; B23B 31/021; B23B 2231/02
See application file for complete search history.

(56) References Cited

U.S. PATENT DOCUMENTS 5,931,722 A * 8/1999 Ohmi ...................... B24B 37/04
451/271
6,106,369 A * 8/2000 Konishi ................ B24B 37/04
451/41
(Continued)

FOREIGN PATENT DOCUMENTS

DE      10085092 B4    8/2007
JP      H06252113 A    9/1994
(Continued)

OTHER PUBLICATIONS

International Search Report dated Feb. 2, 2017 for International Application No. PCT/US2016/046335.
(Continued)

*Primary Examiner* — Dung Van Nguyen
(74) *Attorney, Agent, or Firm* — Blank Rome LLP

(57) ABSTRACT

In a deterministic setting for finishing the support surface of a chuck such as a wafer chuck, the treatment tool may have a contacting surface shaped as a ring, annulus, or toroid, or at least such will be the form of contact when the treatment tool is brought into contact with a flat surface. The treatment tool may have about the same hardness as the work piece (e.g., the wafer chuck) that is being finished. In one embodiment, the treatment tool, or at least the flat contacting surface, is made from silicon carbide (SiC), or contains SiC, for example, in the form of a composite material such as reaction-bonded SiC.

19 Claims, 6 Drawing Sheets

(51) Int. Cl.
*B24B 37/26* (2012.01)
*B24B 27/00* (2006.01)

(56) References Cited

U.S. PATENT DOCUMENTS

| | | | | |
|---|---|---|---|---|
| 6,162,112 | A * | 12/2000 | Miyazaki | B24B 37/105 451/36 |
| 6,179,695 | B1 | 1/2001 | Takahashi et al. | |
| 6,270,392 | B1 * | 8/2001 | Hayashi | B24B 37/042 451/10 |
| 6,312,316 | B1 | 11/2001 | Takahashi et al. | |
| 6,991,524 | B1 * | 1/2006 | Cooper | B29B 17/02 451/272 |
| 2002/0036373 | A1 | 3/2002 | Kosakai | |
| 2004/0198196 | A1 | 10/2004 | Walsh et al. | |
| 2006/0079162 | A1 | 4/2006 | Yamashita et al. | |
| 2007/0049168 | A1 | 3/2007 | Fujita | |
| 2009/0056112 | A1 | 3/2009 | Kobayashi | |
| 2009/0284894 | A1 | 11/2009 | Cooke | |
| 2010/0003902 | A1 | 1/2010 | Tilmaz | |
| 2010/0214549 | A1 | 8/2010 | Cadee et al. | |
| 2012/0024317 | A1 * | 2/2012 | Kitamura | H01L 21/67046 134/6 |
| 2013/0109277 | A1 | 5/2013 | Panergo et al. | |
| 2014/0335767 | A1 | 11/2014 | Suratwala et al. | |
| 2016/0136787 | A1 * | 5/2016 | Bajaj | B24B 37/24 51/298 |
| 2016/0276203 | A1 | 9/2016 | Gratrix | |

FOREIGN PATENT DOCUMENTS

| | | |
|---|---|---|
| JP | H07/171747 | 7/1995 |
| JP | H0936070 A | 2/1997 |
| JP | H1071562 A | 3/1998 |
| JP | 2008/166616 | 7/2008 |
| JP | 2008300775 A | 12/2008 |
| JP | 2009160700 A | 7/2009 |
| JP | 2010/153407 | 7/2010 |
| JP | 2011521470 A | 7/2011 |
| JP | 2014103359 A | 6/2014 |
| JP | 2014128877 A | 7/2014 |
| WO | WO 2011/002881 | 1/2011 |
| WO | WO 2013/113568 | 8/2013 |
| WO | WO 2013/113569 | 8/2013 |

OTHER PUBLICATIONS

International Search Report dated Apr. 12, 2016 for International Application No. PCT/US2015/062231.
Marcin Golabczak, "Polishing of Hard Semiconductor Materials Made of Silicon Carbide", *Mechanics and Mechanical Engineering*, Technical University of Lodz, Lodz, Poland, vol. 15, No. 1, (2011).
Eric W. Weisstein, *CRC Concise Encyclopedia of Mathematics*, pp. 46 and 1184, CRC Press 1999.
Notice of Reasons for Refusal in counterpart JP Appl. 2018-507627, dated Oct. 27, 2020, 12-pgs.

* cited by examiner

METHOD FOR DETERMINISTIC FINISHING OF A CHUCK SURFACE

CROSS-REFERENCE TO RELATED APPLICATION(S)

This patent document claims the benefit of U.S. Provisional Patent Application No. 62/205,643, entitled "Method for deterministic finishing of a chuck surface", filed on Aug. 14, 2015 in the name of inventor Edward Gratrix. Where permitted, the entire contents of this provisional patent application are incorporated by reference herein.

STATEMENT REGARDING U.S. FEDERALLY SPONSORED RESEARCH

None.

TECHNICAL FIELD

The present invention relates to the use of a unique treatment tool in a deterministic manner for grinding, lapping, polishing or roughening the surface of a work piece such as a chuck for supporting semiconductor wafers.

BACKGROUND ART

Chucks, such as pin chucks, are used to hold flat components for processing. The most common use is to hold wafers (Si, SiC, GaAs, GaN, Sapphire, other) during processing to yield a semiconductor device. Other uses include holding substrates during the fabrication of flat panel displays, solar cells and other such manufactured products. These chucking components are known by many names, including wafer chucks, wafer tables, wafer handling devices, etc.

The use of pins on these devices is to provide minimum chuck-to-substrate contact. Minimum contact reduces contamination and enhances the ability to maintain high flatness. The pin tops need to have low wear in use to maximize life and precision. The pin tops also need to possess low friction so the substrate easily slides on and off, and lies flat on the pins.

A pin chuck consists of a rigid body with a plurality of pins on the surface on which the substrate to be processed (e.g., Si wafer) rests. The pins exist in many geometries, and go by many names including burls, mesas, bumps, proud lands, proud rings, etc.

Regardless of whether, the chuck is of the "pin" type or not, the surface that supports whatever is to be chucked (e.g., a semiconductor wafer) needs to be flat to a very high degree of precision. In the case of semiconductor lithography, the flatness is measured in nanometers (nm).

Methods of flattening are often limited by the flatness of the equipment used such as a flat lap or over arm configuration. With harder and harder materials like ceramics, and in particular SiC and reaction bonded SiC (sometimes referred to here as "RBSC" or "RBSiC"), the uniformity of the lap conditions tend to dominate the cause for non uniformity. These conditions are properties like media, swarf (e.g., contamination or debris), velocity and pressure distribution.

There are common techniques to deterministically correct for the errors by using a smaller tool and generating a mathematical "hit" map to locally remove more or less material. Some techniques for this deterministic correction include, but not limited to, Ion Beam Figuring (IBF), Magneto Rheological Finishing (MRF), and computer controlled polishing (CCP). As used herein, the phrase "deterministic correction" means that figure, elevation or roughness data as measured for example, by an interferometer or profilometer, is fed into a finishing machine such as a lapping machine, and the machine processes only those areas of the work piece that are in error and need processing (e.g., grinding, lapping or texturing). The machine does not automatically treat the entire surface of the work piece.

For tools, particularly used in semiconductor handling, the flatness is critical; however, unlike optical surfaces, which require control of a wide range of spatial frequencies, these applications require control over only a narrow range of spatial frequencies.

The issue with using known deterministic techniques is the tool size is often fixed over a narrow range of spatial frequencies (<10 mm), and the tool needs to be traversed over a substantially large substrate (450 mm), thus consuming massive amounts of processing and machining time.

The instant invention addresses these issues, and provides a solution.

DISCLOSURE OF THE INVENTION

In a deterministic setting for finishing the support surface of a chuck such as a wafer chuck, the treatment tool may have a contacting surface configured such that when this contacting or treatment surface is brought into contact with a flat surface, for example, of that of a wafer chuck, the are of contact may be in the form of a circle, ring, or annulus. Thus, the contacting surface of the treatment tool may be slightly toroid-shaped, even though it may appear flat using a mere visual inspection. The treatment tool may have about the same hardness as the work piece (e.g., the wafer chuck) that is being finished. In one embodiment, the treatment tool, or at least the contacting surface, is made from silicon carbide (SiC), or contains SiC, for example, in the form of a composite material such as reaction-bonded SiC.

Embodiments of the instant invention provide for a method for finishing the support surface of a chuck, comprising:

(a) providing a machine comprising a treatment tool comprising an operating or contacting surface of uniform elevation, and shaped such that when the contacting surface of the treatment tool is brought into contact with a flat surface, the area of contact is in the form of a circle, ring or annulus;

(b) providing information to said machine concerning one or more regions on the support surface that require correction;

(c) physically or mechanically contacting said operating surface of said treatment tool to said support surface; and (d) moving said treatment tool at an applied pressure over at least a portion of said chuck support surface to be finished, whereby said machine uses said inputted information to treat substantially only those regions of said support surface that require correction;

(e) and wherein a diameter of said support surface is larger than a diameter of said annulus.

Other embodiments of the instant invention provide for a method for finishing the support surface of a chuck, comprising:

(a) providing a plurality of treatment tools each comprising a flat surface configured to contact and pass over said support surface;

(b) contacting said flat surface of each of said treatment tools to said support surface; and (c) simultaneously moving at least two of said plurality of treatment tools at an applied pressure over at least a portion of said chuck support surface to be finished;

(d) wherein said applied pressure of each of said plurality against said support surface is independent of that of the others of said plurality, and controllable;

(e) and further wherein a diameter of said support surface is larger than an effective diameter of said plurality.

MODES FOR CARRYING OUT THE INVENTION

Figure 1:
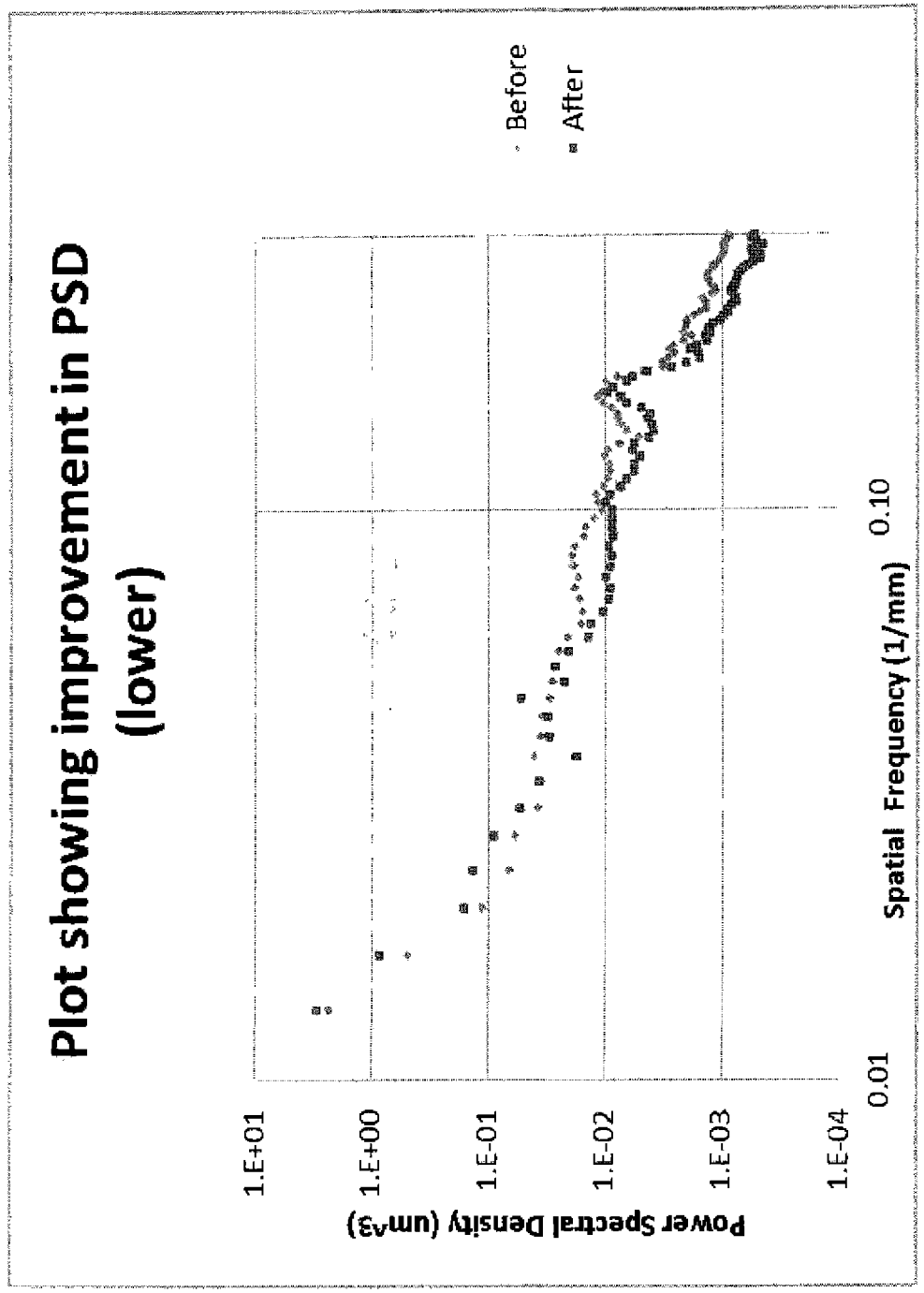
FIG. 1 is a power spectral density plot showing the reduction in amplitude of the spatial frequencies nominally associated with an annular tool of 18 mm diameter.

In a first aspect of the invention, a novel treatment tool is used in a deterministic manner to process (e.g., grind, lap, polish, roughen or clean) a work piece such as the support surface of a wafer chuck. The treatment tool features a surface of uniform elevation configured to contact and abrade the surface of the work piece as the treatment tool passes over it. The treatment tool may have about the same hardness as the work piece. Visually, the treatment tool may have the appearance of a disc. Alternatively, it may appear as an annulus, ring or toroid. If shaped as an annulus or ring or toroid, the space inside or within the annular space may contain a second treatment tool. Further, the treatment tool may feature a plurality of rings or toroids gathered or assembled together, and collectively defining a common flat surface.

In one embodiment, the treatment tool is 27 mm in diameter. Visually, the contact surface appears to be a flat disc, but in reality it has a slight toroidal shape so that when it is brought into contact with the flat surface, the area of contact is not that of a disc but instead is a circle or annulus.

The same treatment tool may be used in cleaning, profiling and roughening modes, depending upon how the tool is used. For example, given a 27 mm diameter tool fabricated from reaction bonded silicon carbide, for cleaning debris off of a wafer chuck of similar hardness, a dead weight loading of 5-50 grams, and a tool velocity of 5-30 mm/sec may be used. For profiling (e.g., flattening) a surface, the loading may be 100-175 grams, and the tool velocity may be 20-50 mm/sec. For imparting surface roughness, the tool loading may be in excess of 150 grams, and the tool velocity relative to the surface being processed may be 20-50 mm/sec.

The treatment tool may be provided in different sizes (diameter or effective diameter), depending on the size of the features or region on the work piece to be processed. For example, a smaller diameter treatment tool (for example, about 10 mm) may be used to treat recessed regions on a wafer chuck, such as the vacuum seal ring on a vacuum chuck.

According to a first aspect of the instant inventive method for mechanically finishing the support surface of a chuck, instead of a single treatment tool having a flat operating or processing surface, a plurality of such treatment tools are provided. At least two, and typically all of the tools of the plurality are used simultaneously. The tools process the support surface mechanically, that is, by removing material via abrasion. The tools may be moved as a group. Each tool is allowed to "float" on the surface, that is, to seek its own conformity with the surface. The pressure that each tool applies against the support surface may be controlled independently of the other tools in the plurality. The tool, or at least the flat surface of the tool, may be shaped as a ring or annulus. Tools may be arranged concentrically, that is, along a common axis that is normal to the flat surface. Tools may also be arranged as a cluster, with no common axis that is normal to the flat surface. The processing of the support surface may be performed deterministically, that is, by programming the finishing to respond to a "hit" map of the elevation or roughness/smoothness of the support surface.

According to a second aspect of the invention, a treatment tool is used in a deterministic environment, with the treatment tool (i) being smaller in diameter or 'effective diameter" than the diameter of the work piece (e.g., wafer chuck), and (ii) shaped as a toroid, or having a surface configured to physically contact the work piece that is ring or annulus-shaped.

According to a third aspect of the invention, a treatment tool is used in a deterministic environment, with the treatment tool having a surface configured to physically contact the work piece, with that contacting surface having a hardness that is about the same as the hardness of the work piece surface. In one embodiment, the treatment tool, or at least the flat contacting surface, is made from silicon carbide (SiC), or contains SiC, for example, in the form of a composite material such as reaction-bonded SiC.

In a deterministic setting or environment, the treatment tool is part of a machine. The machine receives data or information from an instrument such as an interferometer or profilometer. The data may be "figure" or elevation, or surface roughness information, expressed as a function of location on the surface of the chuck. This form of the data may be mathematically derived using the tool foot print or influence into a "hit map", as it shows which locations are too high or too low or of the wrong surface roughness, and therefore it indicates to the machine which regions need to be processed by the treatment tool. The machine may then instruct the treatment tool to process those regions necessary to achieve the desired figure and roughness. The hit map may permit the machine to ignore regions on the chuck that do not require attention, thereby saving time.

The invention embodiments will now be further described with specific reference to the attached drawings.

Referring first to FIG. 1, what is shown is a plot of Power Spectral Density as a function of Spatial Frequency. Power Spectral Density is a measure of the amplitude of the deviations from the intended or desired elevation or profile of a surface. Spatial Frequency is a measure of the periodicity of these deviations; that is, how often do they occur in a given distance. What is plotted is elevation data for a surface before and after mechanical finishing treatment. That the "after" curve is below the "before" curve indicates that the deviations in elevation are being reduced; that is, the profile of the surface is closer to what is desired. In this case, flatness is desired, and the treatment shows that the work piece is getting flatter.

A lower power spectral density is desirable, which for this example, demonstrates that the part is getting flatter. The periods where the change occurred is nominally in and about 18 mm and smaller, corresponding to a spatial frequency of about 0.06 (cycle) per mm (or 0.06 1/mm).

Figure 2:
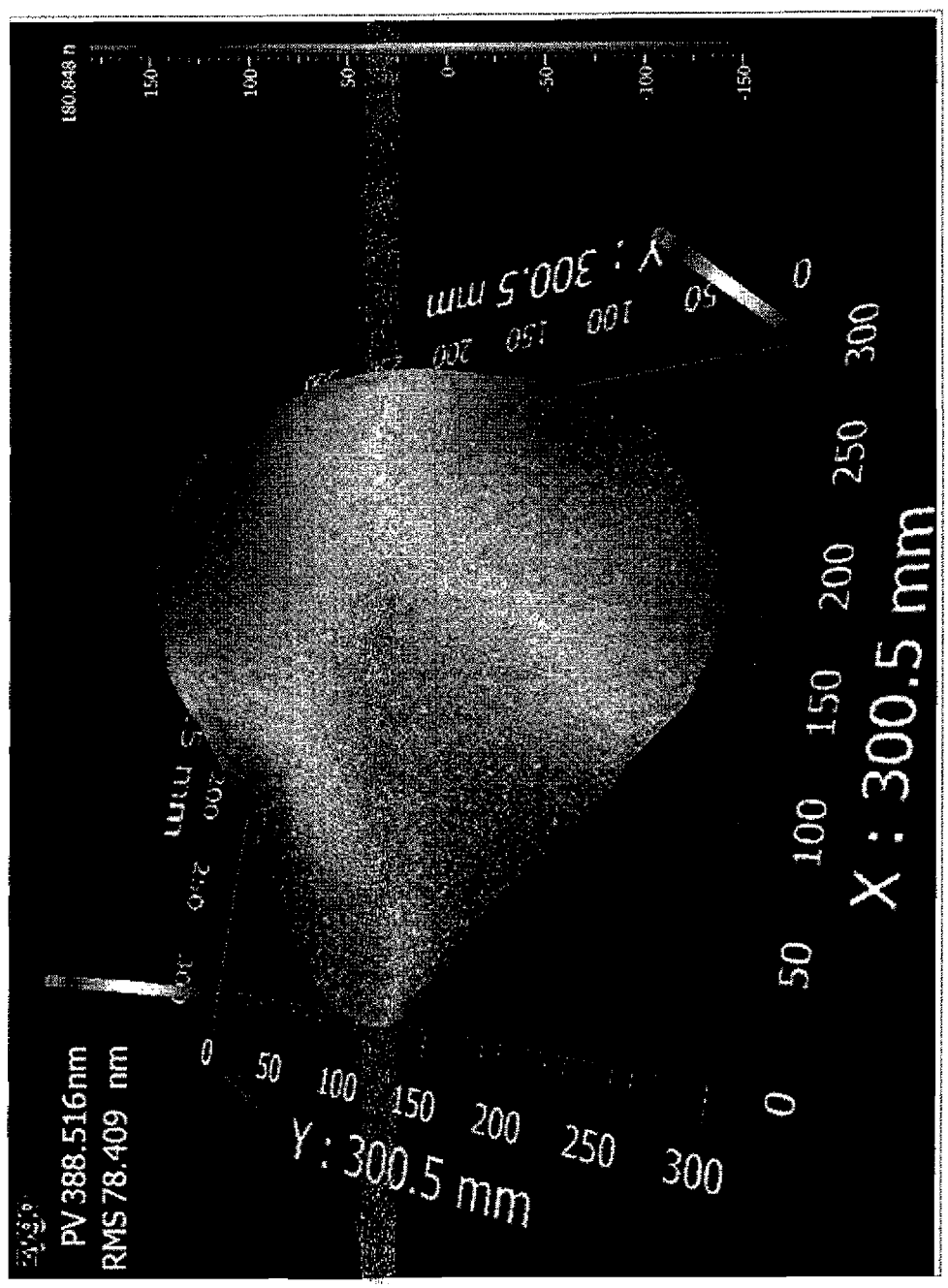
FIG. 2: This figure shows a typical part with global curvature in predominately the form of a sphere and saddle shape. These are the features that need to be eliminated.
Figure 3:
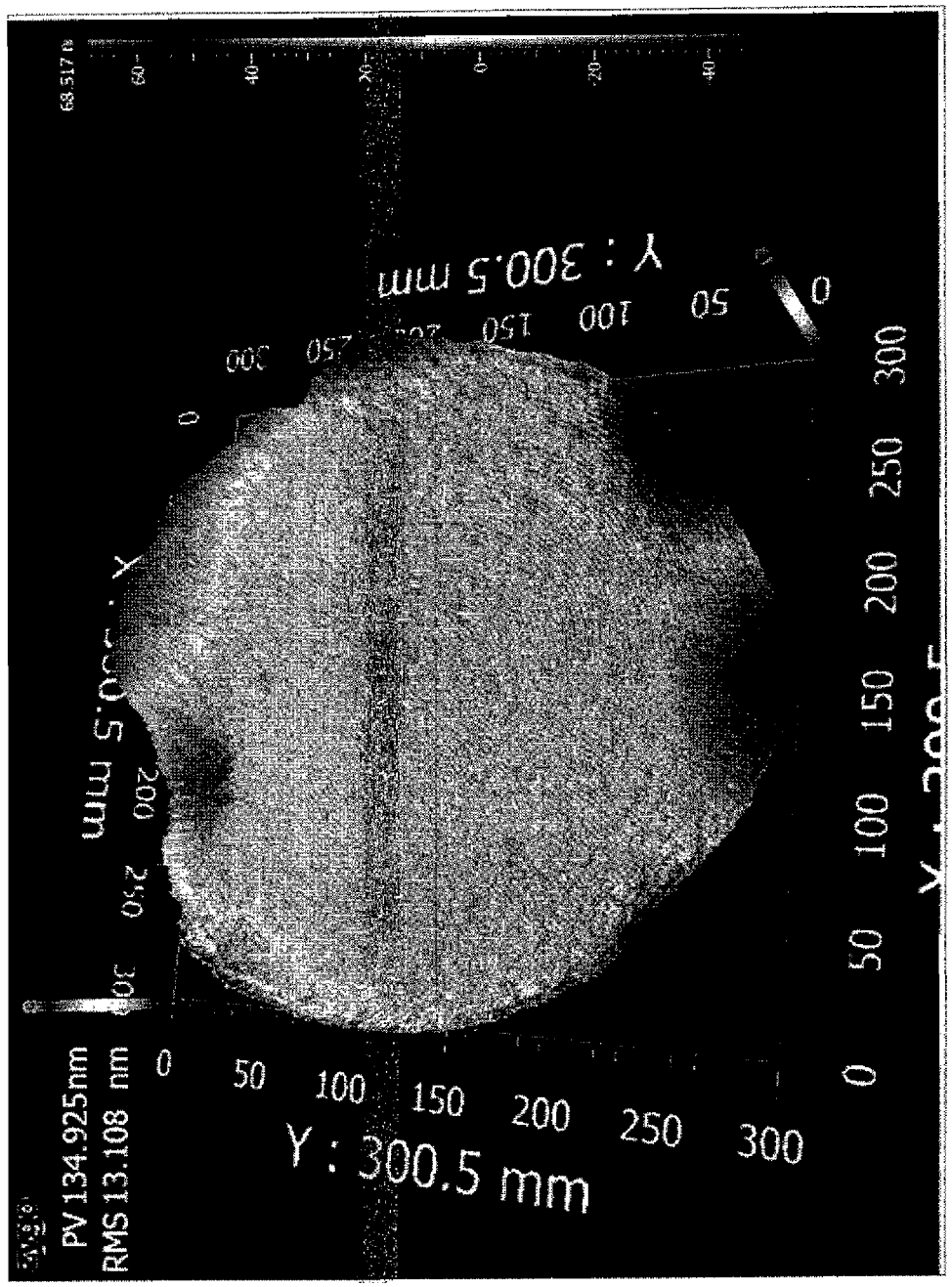
FIG. 3: This shows the same part as in FIG. 2 with a low spatial frequency removed. This region is where some applications are the most sensitive.

FIGS. 2 and 3 are interferometer images that show these elevation deviations in gray scale as a function of location or position on the surface. FIG. 2 shows the targeted spatial frequencies that need to be removed, that is, reduced in elevation error. FIG. 3 shows the same part as in FIG. 2 with a low spatial frequency removed. That is, errors of a long periodicity or long wavelength (on the order of the diameter of the surface) have been removed; the overall flatness of the surface has been improved. This region is where some applications are the most sensitive.

Figure 4:
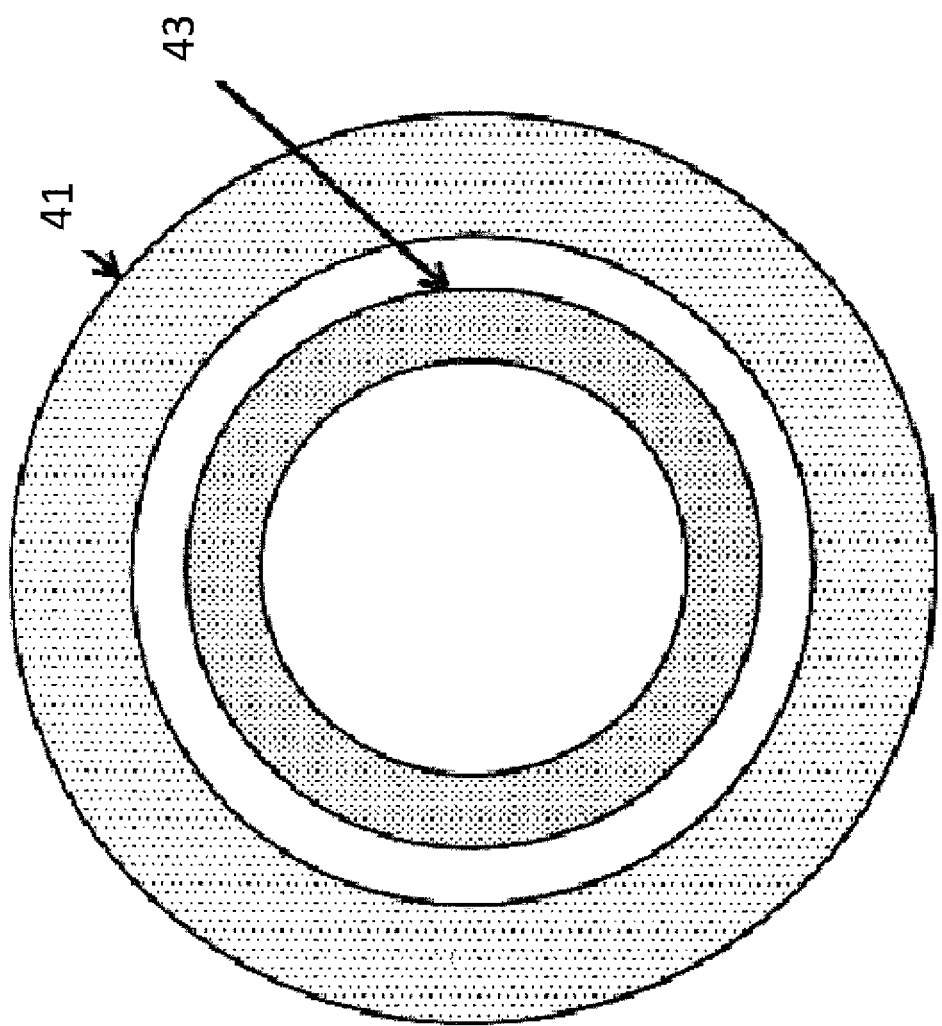
FIG. 4: Diagram showing concentric tools of different diameter, each independently configured with pressure to float over surface to fulfill a specific function: shape, flatten or roughen for example.

Referring now to FIG. 4, what is shown is a top view of a drawing showing concentric tools of different diameter, each independently configured with pressure to float over surface to fulfill a specific function, shape, flatten or roughen for example. Here, flattening will be performed before roughening, and will typically involve a greater amount of material being removed than does roughening. This illustration depicts the outer concentric tool 41 performing the flattening operation, and the inner concentric tool 43 performing the roughening operation.

Figure 5:
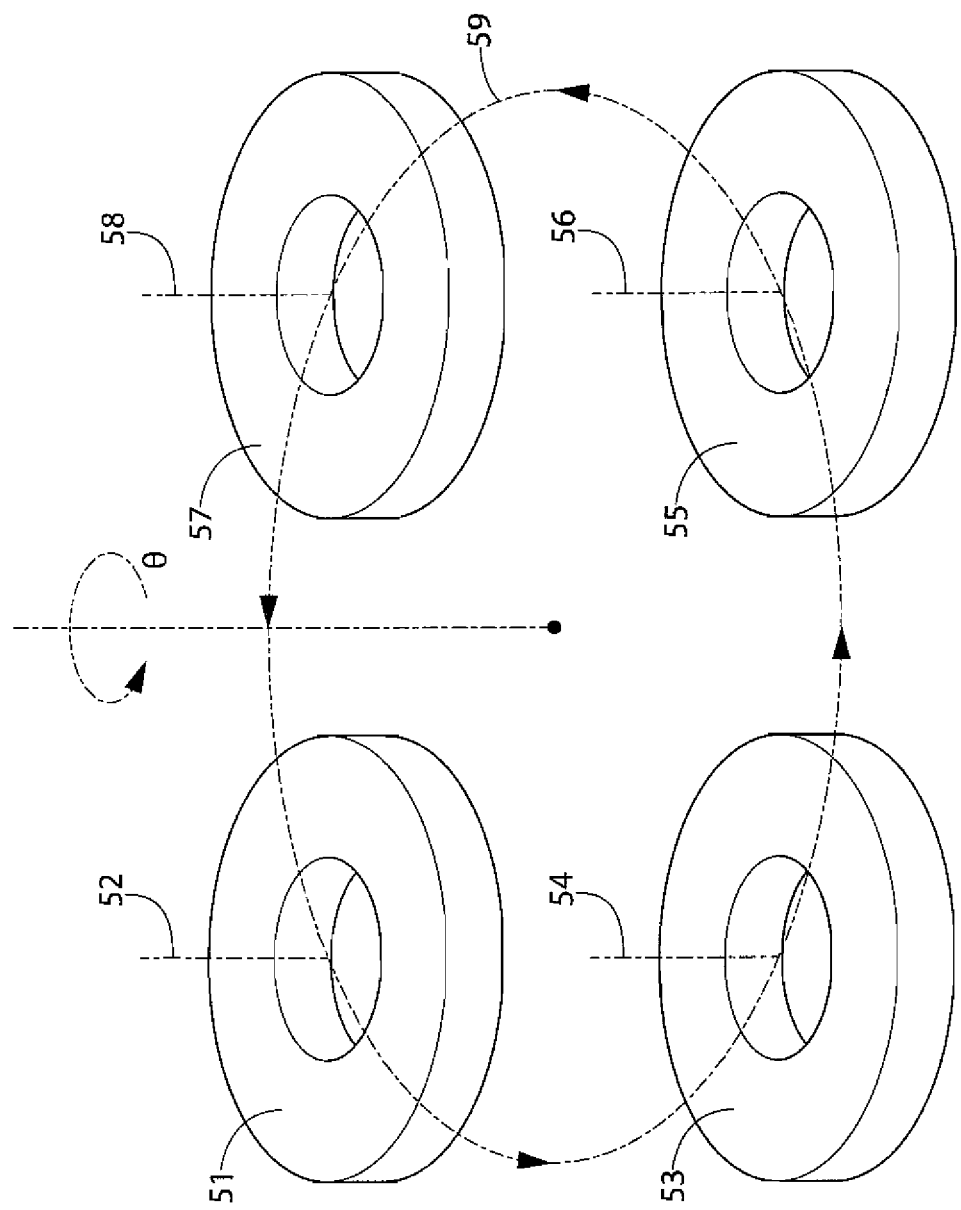
FIG. 5: An option showing a cluster of two or more tools that are non-concentric performing independent actions of shaping of different spatial frequency ranges or texturing (roughening/smoothing). Rotation of the cluster allows the action to appear as one larger tool head with a designed function by the sum of the independent members of the cluster. All tools are free to float on the surface.

FIG. 5 depicts a top view of a drawing of a plurality of treatment tools 51, 53, 55, 57 arranged in non-concentric fashion. Here, the arrangement is termed a "cluster", showing two or more tools that are non concentric performing independent actions of shaping of different spatial frequency ranges or texturing (roughening/smoothing). The cluster is mounted to a rotatable shaft Θ ("theta") that rotates on its longitudinal axis, termed the "theta" axis. Each tool is mounted to an axis 52, 54, 56, 58, which do not have to be parallel to one another, but are each attached to central axis Θ. Rotation of the cluster allows the action to appear as one larger tool head moving along path 59 with a designed function by the sum of the independent members of the cluster. All tools are free to "float" (conformally) on the surface, for example, by being minimally constrained in their attachment to their respective axes, for instance, by means of a ball-and-socket joint.

EXAMPLE

The invention will now be further described with reference to the following Example.

Example 1: Imparting Roughness Change

Figure 6B:
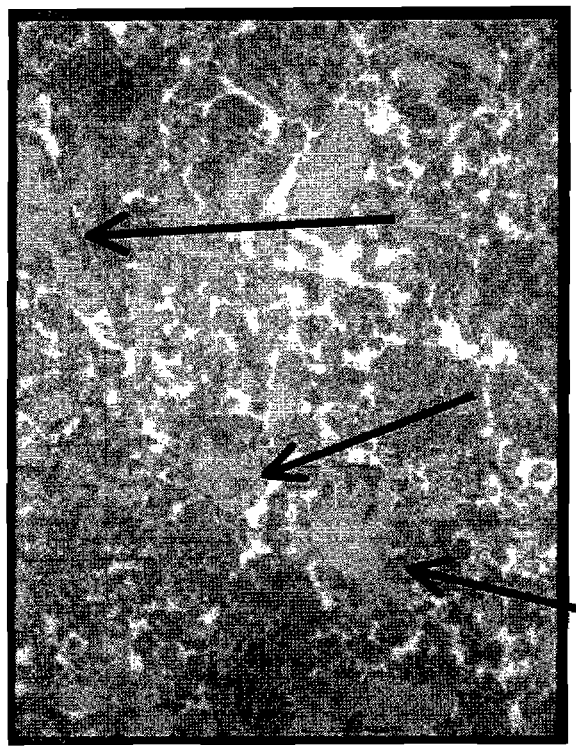
FIGS. 6A and 6B are optical photomicrographs of a ground and polished reaction bonded silicon carbide flat surface before and after treatment with a tool operated in "surface roughening" mode.
Figure 6A:
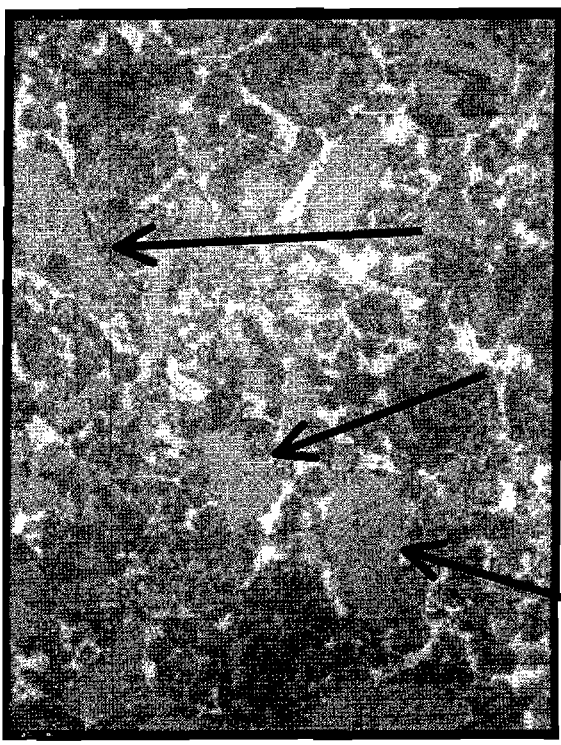

This example demonstrates a localized roughness change, and is made with reference to FIGS. 6A and 6B.

FIG. 6A is an optical photomicrograph of a ground and polished composite material flat surface prior to its treatment with a tool to deterministically roughen the surface. Both the treatment tool and the surface being processed have about the same hardness and each is fabricated from reaction bonded SiC (RBSC).

The treatment tool is 27 mm in diameter. By outward appearance, it is a disc, but in reality it has a slight toroidal shape so that when it is brought into contact with the flat surface, the area of contact is not that of a disc but instead is a circle or annulus. A dead weight loading of at least 150 grams is applied to the treatment tool. The tool is moved across the surface to be treated at a velocity in the range of 20-50 mm/sec.

FIG. 6B is an optical photomicrograph of the same region of the ground and polished RBSC composite material flat surface of FIG. 6A, but following its treatment with the treatment tool operating in surface roughening mode. The three black arrows in each photomicrograph point to specific SiC grains. By comparing the appearance of the SiC grains near the tops of corresponding arrows, one, can see changes in the grains. These changes are gouges or pits introduced into the grains as a result of the motion of the treatment tool over the flat surface.

Thus, this Example shows that the treatment tool of the instant invention can be used in a mode to impart localized surface roughness to a target surface being treated.

INDUSTRIAL APPLICABILITY

Although much of the forgoing discussion has focused on articles and devices for chucking semiconductor wafers, one of ordinary skill in the art will recognize other related applications where the techniques and articles disclosed in the instant patent application will be useful, for example, in other aspects of semiconductor wafer handling such as Vacuum Wafer Chucks, Wafer Arms, End Effectors, Retical Clamps and Susceptors.

What is proposed is to use mechanical techniques to flatten one or more narrow band of spatial frequencies using one or more tools, which may be annular or ring-shaped or toroidal. The ability to use several tools simultaneously allows for dramatic reduction in machining time.

Expanding a little further on this last point, in this aspect of the invention where multiple tools are used simultaneously, since the applied pressure on each tool can be, independently controlled, and since pressure is highly relevant to the mode in which the tool operates, e.g., cleaning versus profiling versus roughening, one tool can be loaded so as to perform in one mode, e.g., cleaning, while another tool is loaded to perform in a different mode, e.g., flattening or profiling. It may also be possible to differentiate modes of operation based upon velocity of the tool relative to the surface being treated. For example, in the embodiment in which treatment tools are arranged concentrically, if the tools are rotating with the same angular velocity, the outer tool will trace out a larger circumference than will the inner tool; thus, its surface velocity will be greater than that of the inner tool.

An artisan of ordinary skill will appreciate that various modifications may be made to the invention herein described without departing from the scope or spirit of the invention as defined in the appended claims.

What is claimed is:

1. A method for finishing a support surface of a chuck, the support surface having a first diameter and having a first hardness, the method comprising:
   (a) providing a machine comprising a plurality of treatment tools, each of the treatment tools comprising a slightly toroid-shaped surface configured to contact and pass over said support surface, wherein said slightly toroid-shaped surface of one or more first of said treatment tools comprises a second diameter and wherein said slightly toroid-shaped surface of one or more second of said treatment tools comprises a third diameter smaller than the second diameter;

(b) providing information to said machine concerning one or more regions on the support surface that require correction;

(c) physically or mechanically contacting said slightly toroid-shaped surfaces of said treatment tools to said support surface; and (d) flattening said support surface with said one or more first treatment tools and imparting localized roughness to said support surface with said one or more second treatment tools by moving said treatment tools at independent applied pressures over at least a portion of said support surface to be finished, wherein said independent applied pressure of each of said treatment tools against said support surface is controllable and is independent of that of the others of said treatment tools, whereby said machine responds deterministically to said inputted information to treat substantially only those regions of said support surface that require correction;

wherein each of said treatment tools has a second hardness being about the same as the first hardness as said support surface; and wherein the first diameter of said support surface is larger than an effective diameter of the treatment tools.

2. The method of claim 1, wherein said inputted information instructs said machine to correct a figure or elevation of said one or more regions.

3. The method of claim 1, wherein said inputted information instructs said machine to correct a texture of said one or more regions.

4. The method of claim 1, wherein said slightly toroid-shaped surface configured to contact said support surface comprises SiC.

5. The method of claim 1, wherein said slightly toroid-shaped surface configured to contact said support surface comprises reaction-bonded SiC.

6. The method of claim 1, wherein said correction comprises cleaning debris from said support surface.

7. The method of claim 1, wherein said correction comprises correcting a profile.

8. The method of claim 1, wherein said correction comprises correcting a roughness.

9. The method of claim 1, wherein said correction comprises cleaning.

10. The method of claim 1, wherein each of the treatment tools is attached to the machine by a minimally constrained attachment such that said configured surface of said treatment tool is configured to conformally contact said support surface.

11. The method of claim 10, wherein said minimally constrained attachment comprises a ball-and-socket joint.

12. The method of claim 1, wherein at least two of said treatment tools are about the same size.

13. The method of claim 1, wherein said contact between each of said treatment tools and said support surface is shaped as a circle.

14. The method of claim 1, wherein a pair of said one or more first and second treatment tools are arranged concentrically.

15. The method of claim 1, wherein said plurality of treatment tools are arranged along a common axis that is normal to said support surface.

16. The method of claim 1, wherein said plurality of treatment tools are arranged as a cluster that do not share a common axis that is normal to said support surface.

17. The method of claim 1, wherein said moving comprises removing material from said support surface to engineer an elevation of said support surface to a desired profile.

18. The method of claim 1, wherein said moving comprises removing material from said support surface to engineer a desired roughness or smoothness of said support surface.

19. The method of claim 18, wherein said removing of material is performed deterministically.

* * * * *